United States Patent Office.

HORATIO N. HARBACH AND THEODORE J. HARBACH, OF PHILADELPHIA, PENNSYLVANIA.

Letters Patent No. 113,047, dated March 28, 1871.

IMPROVEMENT IN CONFECTIONERY OR COCOANUT-CANDY.

The Schedule referred to in these Letters Patent and making part of the same.

*To all whom it may concern:*

Be it known that we, HORATIO N. HARBACH and THEODORE J. HARBACH, of the city and county of Philadelphia and State of Pennsylvania, have invented a new and useful Article of Confectionery; and we do hereby declare the following to be a clear and exact description of the nature thereof, sufficient to enable others skilled in the art to which our invention appertains to fully understand and make the same.

Our invention consists of a delicious and wholesome article of confectionery, which we denominate as Caramel-Cocoanut, or Cocoanut-Caramel.

In manufacturing the article we proceed as follows:

Assuming fifty (50) pounds as a standard, we take thirty (30) pounds of white sugar, (A-brand,) and twenty (20) pounds of finely-grated cocoanut, the latter being pared and only the white or inside part thereof used.

First, the sugar is boiled for twenty minutes, or until it arrives at that stage or condition termed a "crack;" that is, until a small portion, on being placed in cold water and then crushed in the hand, will crack.

Secondly, the finely-grated cocoanut is then to be immediately added to the boiling mass of sugar, and the whole now instantly, vigorously, and continually stirred or kept moving to prevent scorching, and also secure the thorough incorporation of the materials, besides obtaining the proper brown color.

This stirring or movement of the particles is continued for a period of forty minutes, more or less, or until a second crack, or almost a crack, is obtained, the weather or temperature generally determining the latter point, a lower or higher point of temperature governing the manufacturing relatively to cold or warm weather.

The mass of sugar and cocoanut, as thus prepared, is then transferred to a marble slab and spread out until a thickness of about one-half of an inch is obtained.

After the mass, thus spread, becomes well set upon the slab, it is cut about half through from the top in squares or other shapes, by means of knives, and then left to cool. When entirely cold or hardened, it is cracked on the under or uncut side until all the squares separate; then the candy presents the small semi-cubes or blocks.

These blocks are now placed in a swing-basin or Dragee-pan and agitated or swung from side to side, and at the same time small quantities of sugar, boiled to a sirup, are applied upon said blocks in the basin, alternating with small quantities of dry white sugar, (A-brand;) this to be continued for about ten minutes, more or less, according to judgment, or until the blocks are completely covered.

The blocks are then laid upon wooden trays placed in a room in which the temperature is about 60° Fahrenheit, and allowed to remain twenty-four hours to become perfectly dry.

The candy is then fit for sale or ready for use.

It will be found that the product is highly flavored and delicious to the taste, and has the appearance of the confections called caramels.

The outside coating or covering preserves the interior or body of the candy from the effects of changes of temperature, climate, &c., this feature being novel and of vast importance to the class of candy known as cocoanut-candy.

Having thus described our invention,

What we claim as new, and desire to secure by Letters Patent, is—

1. The within-described article of confectionery, prepared of the ingredients, in about the proportion, and in the manner substantially as set forth.

2. The article of cocoanut-candy prepared of the ingredients as set forth, and coated or covered for the purpose stated.

The above signed by us this 13th day of March, 1871.

HORATIO N. HARBACH.
THEO. J. HARBACH.

Witnesses:
JOHN MAKER,
JOHN A. WIEDERSHEIM.